United States Patent [19]

Jirka

[11] 4,080,628
[45] Mar. 21, 1978

[54] EXPANDED-SIGNAL IMAGE ENHANCEMENT SYSTEM

[75] Inventor: Howard F. Jirka, Mount Prospect, Ill.

[73] Assignee: Zenith Radio Corporation, Glenview, Ill.

[21] Appl. No.: 777,374

[22] Filed: Mar. 14, 1977

[51] Int. Cl.² .............................................. H04N 5/68
[52] U.S. Cl. .................................... 358/166; 358/242; 358/37
[58] Field of Search ................... 358/166, 242, 37, 64, 358/65; 315/391, 394

[56] References Cited

U.S. PATENT DOCUMENTS 2,678,964  5/1954  Loughlin .............................. 358/166
3,980,819  9/1976  Schwartz .............................. 358/166

Primary Examiner—John C. Martin
Attorney, Agent, or Firm—Nicholas A. Camasto; Roy A. Ekstrand

[57] ABSTRACT

A color television receiver includes well-known circuitry for detection and display of a received broadcast signal. Image enhancement means produce an expanded element luminance signal. A differentiating network produces the derivative of the expanded-element signal and a differential amplifier couples the derivative signal in a "push-pull" fashion to a pair of electrostatic deflection plates which influence the horizontal scansion of the receiver. A method of image enhancement as well as derivative processing and signal delay structures are shown.

12 Claims, 6 Drawing Figures

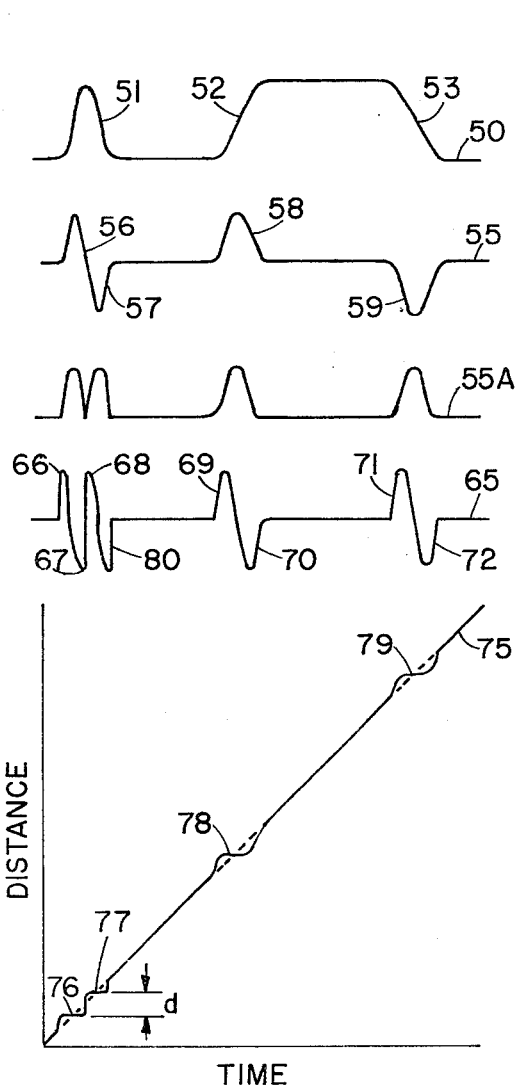
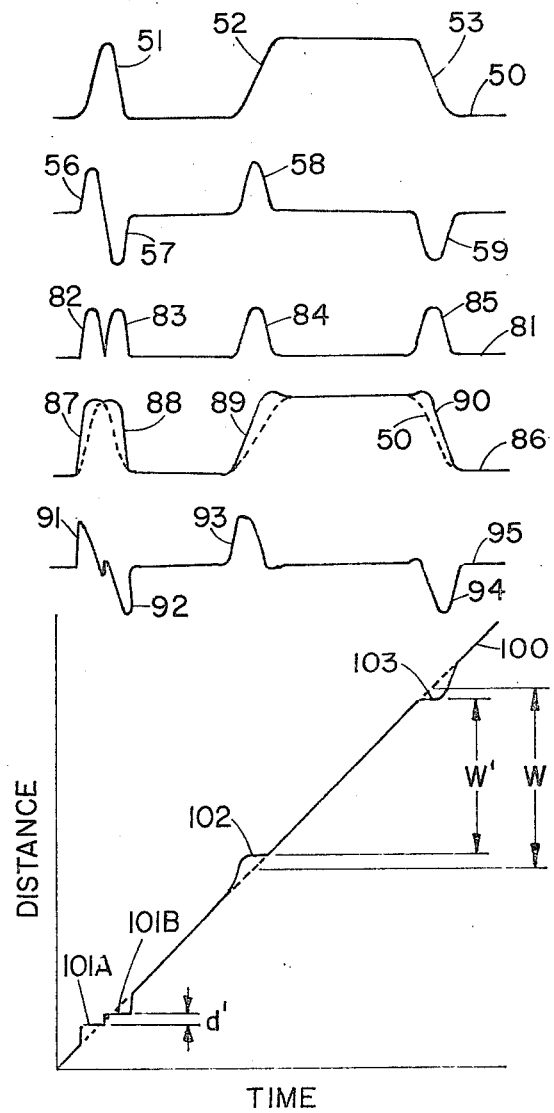
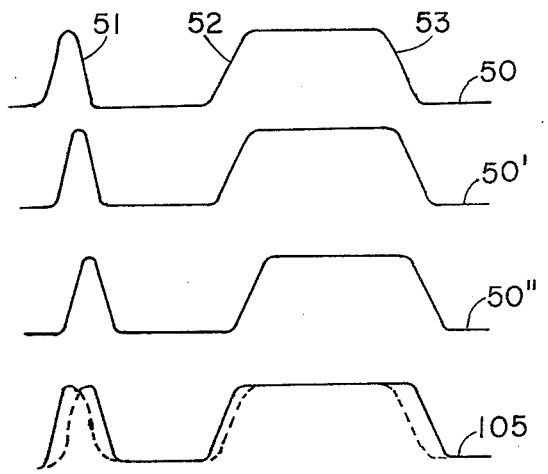
FIG. 4
FIG. 5
FIG. 6

EXPANDED-SIGNAL IMAGE ENHANCEMENT SYSTEM

BACKGROUND OF THE INVENTION

This invention relates generally to scanned display systems such as those utilizing a cathode ray tube display device. It relates more particularly to systems of image enhancement which employ velocity modulation in one direction of scan.

Typically, scan display systems of the type to which the present invention pertains comprise a viewing screen which is sequentially scanned in two orthogonal directions. The intensity of the displayed image is instantaneously controlled by an intensity control signal. When an abrupt change in brightness level is sought to be reproduced, a problem arises due to the finite time required for the intensity control system to effect a change of image brightness level. Because scan continues during this interval, the brightness change in the transition area is gradual, rather than abrupt, in character producing a blurred edge on the depicted image. In a cathode ray tube, for example, of the type used as the display device in television receivers, electronic games and computer readout terminals, one or more electron beams are directed toward a phosphor viewing screen which emits light when struck by high-energy electrons. The electron beam, or beams, are caused to scan in both horizontal and vertical directions by an electromagnetic deflection yoke positioned on the CRT adjacent the electron beam path. Control electrodes within the CRT facilitate voltage control of the CRT beam current which in turn, controls image brightness. The limited bandwidth of the circuitry driving these control electrodes and producing the intensity control voltages gives rise to the above-described edge blurring when an abrupt or instantaneous change in brightness level is sought.

These difficulties have lead practitioners in the art to develop systems which temporarily arrest horizontal scan during attempts to produce abrupt changes of the intensity signal. One such system is set forth in U.S. Pat. No. 2,678,964 which shows a system in which the horizontal scan is velocity modulated with enhancement signals produced by taking various derivatives of the image intensity signal. The basic idea is to stop, or slow, the movement caused by scansion during the brightness transition period allowing time for the intensity control circuitry to change from one intensity level to another. While it is possible to produce such enhancement by combining the enhancement signal directly with the deflecting field used in the primary scanning circuitry, it has been found generally more advantageous to employ separate deflecting means which are responsive solely to the enhancement signal. Most commonly, these individual deflection means comprise either additional electromagnetic windings similar to the deflection yoke or electrostatic deflection plates positioned at an appropriate point along electron beam travel path to influence the electron path.

The above-described enhancement system (often called spot arrest) provides substantial improvement in the apparent resolution of the transition edges of the displayed image in a bandwidth limited system. However, several problems have resulted which have thus far imposed significant limitations on the degree of improvement observed in the displayed image taken as a whole. For example, when the enhancement signal used comprises a simple first derivative of the intensity control signal, a geometric distortion of the displayed image results, caused by a shift in the position of the image transition. This distortion causes white objects to appear narrower than intended and black objects to appear wider than intended. In addition, the relationship between the point at which the scan is arrested by the first derivative enhancement signal and the most visible changes in beam current intensity, causes the "leading" edge of white objects to display a high intensity border yielding a very "harsh" image element.

Some improvement is realized if the enhancement signal having a first derivative of the intensity control signal is combined with an additional component comprising the second derivative of the intensity control signal. However, the improvement realized is limited to large scene components and degradation of small fine-detail scene components not seen in pure first derivative enhancement results. The second derivative enhancement component degrades the ability of the display system to depict very small objects often called "single picture elements". For example, a fine white line scene component surrounded by a dark background will, in response to second derivative enhancement, be erroneously displayed as a pair of fine intense white lines spaced apart by a lower luminance area.

Accordingly, it is a particular object of the present invention to provide an improved method and structure of image enhancement. It is a more particular object of the present invention to provide image enhancement structures and methods which reduce the geometric distortions occurring in scan modulation image enhancement signals.

SUMMARY OF THE INVENTION

In a scanned display system in which an image having an intensity responsive to an intensity control signal is produced by scansion of a viewing screen in first and second directions, a method of image enhancement comprising the steps of differentiating the intensity control signal with respect to time producing a first derivative signal, forming the absolute value of the first derivative signal, combining the absolute value signal with the intensity control signal to form a combination signal, differentiating the combination signal with respect to time to produce an image enhancement signal, and velocity modulating the first direction scansion with the image enhancement signal.

BRIEF DESCRIPTION OF THE DRAWINGS

The features of the present invention which are believed to be novel are set forth with particularity in the appended claims. The invention, together with further objects and advantages thereof, may best be understood by reference to the following description taken in connection with the accompanying drawings, in the several figures of which like reference numerals identify like elements, and in which:

FIGS. 3 and 4 are curves depicting prior art image enhancement methods.

FIG. 5 is a graphical representation of the performance of the present invention image enhancement system shown in FIG. 1.

FIG. 6 is a graphical representation of the performance of the embodiment shown in FIG. 2.

DESCRIPTION OF THE PREFERRED EMBODIMENTS

Figure 1:
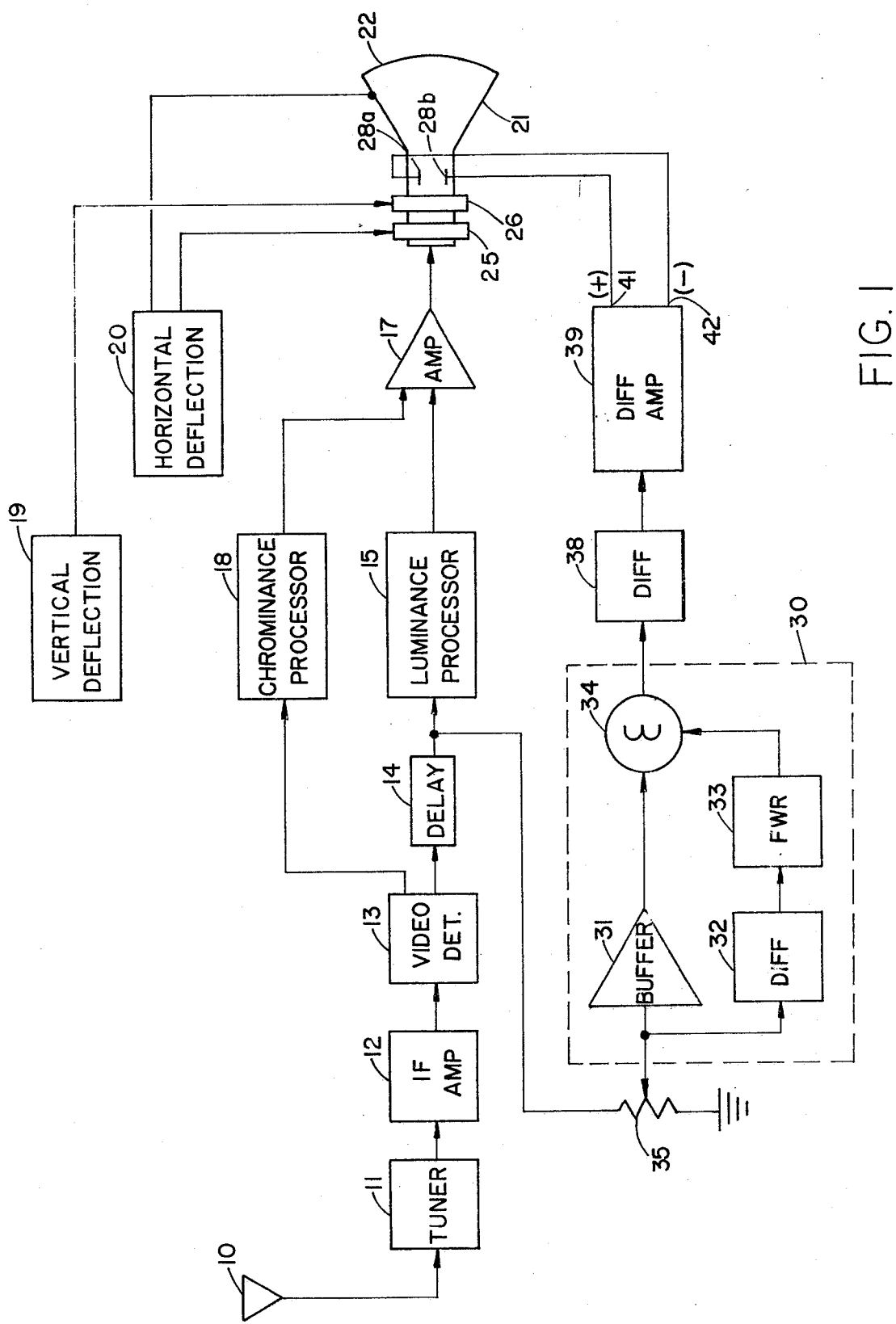
FIG. 1 is a block diagram representation of a television receiver having an image enhancement system constructed in accordance with the present invention.

FIG. 1 shows a television receiver having an enhanced display system constructed in accordance with the present invention. An antenna 10 is coupled to a tuner 11, the output of which is coupled to an IF amplifier 12. A video detector 13 is coupled to IF amplifier 12 and to a chrominance processor 18 and a delay line 14. The output of chrominance processor 18 is connected to amplifier 17 while the output of delay line 14 is connected to a luminance processor 15 and to a potentiometer 35. The output of luminance processor 15 is connected to CRT 21 by an amplifier 17. A vertical deflection system 19 and a horizontal deflection system 20 are connected to a vertical deflection yoke 26 and a horizontal deflection yoke 25 respectively. The movable contact of potentiometer 35 is connected to the inputs of a buffer amplifier 31 and a differentiating network 32. The output of the former is coupled directly to one input of a summing network 34 while the output of the latter is coupled to the other input of summing network 34 by a full wave rectifier 33. The output of summing network 34 is connected to a second differentiating network 38, the output of which is connected to a differential amplifier 39. Differential amplifier 39 has a positive phase output 41 coupled to a deflection plate 28b and a negative phase output 42 connected to a deflection plate 28a.

The operation of the present invention image enhancement system is best understood if the operation of the receiver, exclusive of the image enhancement components 30, 38 and 39, is discussed initially with discussions of image enhancement following thereafter. A received broadcast signal is coupled by antenna 10 to tuner 11 which by the familiar heterodyning process converts the received signal to an intermediate frequency signal which is amplified by IF amplifier 12 to a power level sufficient to drive video detector 13. Detector 13 includes well-known circuitry for recovering the modulated information portions of the intermediate frequency signal as well as circuitry for separating the chrominance and luminance information. The chrominance information in the form of a suppressed-carrier modulated signal is further processed by chrominance processor 18 which includes well-known circuitry for demodulating the chrominance signal to produce appropriate chrominance signals for application to amplifier 17. Delay line 14 delays the luminance signal with respect to the chrominance signal to compensate for the bandwidth difference between chrominance and luminance translating channels. The delayed luminance signal is applied to a luminance processor which includes well-known circuitry for translating the luminance signal and providing appropriate CRT drive signals. In addition, amplifier 17 includes appropriate matrix networks which combine the detected luminance and chrominance signals to form the color video signals which control the intensity of the electron beams within CRT 21.

CRT 21 includes the typical cathode ray tube structure in which one or more electron beams (not shown) are directed toward a viewing screen 22 which comprises a layer of phosphor on the inner surface of the CRT faceplate. The phosphor emits light when struck by high energy electrons. In the case of a monochrome receiver, viewing screen 22 comprises a relatively uniform layer of a single type phosphor while in a color television receiver three different phosphors (each emitting a primary color light) are arranged in groups or lines on the inner face of the CRT.

Vertical and horizontal deflection systems 19 and 20 produce appropriate scansion signals which are applied to respective vertical and horizontal deflection yokes 25 and 26. The yokes comprise electromagnetic coils which in response to the deflection signals provide magnetic fields which cause the electron beams of CRT 21 to progressively scan viewing screen 22 in the horizontal and vertical directions. In addition, horizontal deflection system 20 produces the high voltage accelerating potential for CRT 21.

It will be apparent to those skilled in the art that the television receiver as thus far described is entirely conventional and may be constructed in accordance with well-known principles of television receiver fabrication. It will be equally apparent that the portion thus far described is highly simplified and that subtle aspects of television receiver construction are not specifically detailed but should be understood to be included. For example, it is well-known in the art that both horizontal and vertical deflection systems 20 and 19 would of course be synchronized to the received signal. It is equally apparent that the gains of tuner 11 and IF amplifier 12 are generally controlled by an automatic gain control (AGC) means which functions to maintain a constant signal level for processing by detector 13.

Turning to the image enhancement function of the present invention, luminance element expanding means (shown by dashed-line box 30) process the applied luminance signal to produce an expanded-element luminance signal which is differentiated with respect to time by differentiator 38 to produce an enhancement signal which is converted by a differential amplifier 39 into a "push-pull" signal appropriate to energize deflection plates 28a and 28b. The electric field produced between plates 28a and 28b alters the path of the CRT electron beams in the horizontal plane and provides a velocity modulation of the horizontal deflection.

With this general understanding of the present invention enhancement system, it is believed that an initial discussion of the general process of scan modulation image enhancement at this point will facilitate understanding of the more detailed descriptions of the present invention enhancement systems which follow.

Figure 3:
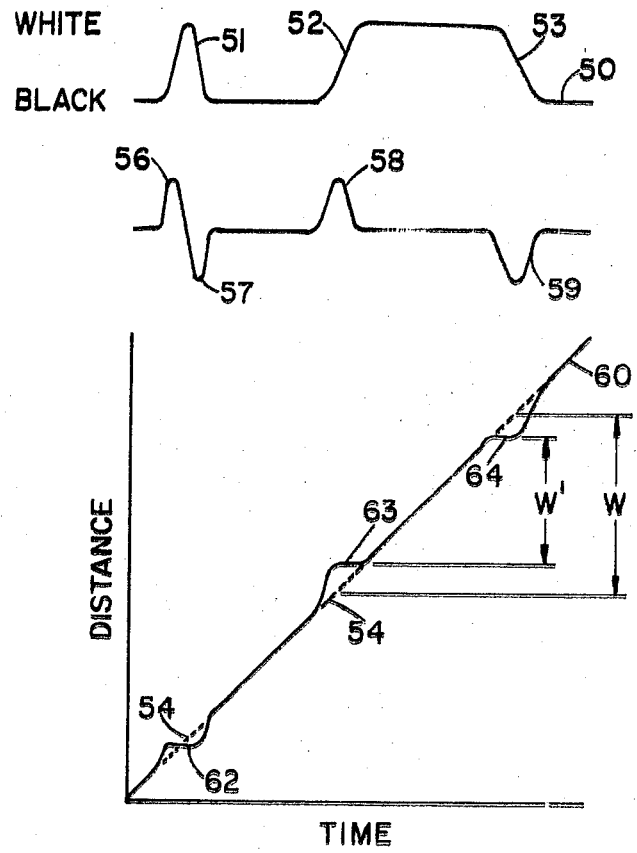

FIG. 3 shows the luminance signal (wave form 50) resulting when the well-known sine-squared window test signal is received. The image produced comprises a black background having a high intensity short duration white vertical line followed by a substantially broader high intensity white square area called a window. Curve 50, which is the luminance signal for one horizontal scan line of this signal, includes a single white image component 51 and large area white component bounded by a positive-going slope 52, forming the transition leading edge, and a negative-going slope 53 forming the transition trailing edge. In many of the prior art image enhancement systems, the first derivative (with respect to time) of the luminance signal 50 is used to provide the above-described velocity modulation horizontal scan. Such a "first derivative" signal (shown as curve 55) includes a positive-going component 56 followed by a negative-going component 57 which correspond to the derivatives of the leading and trailing edge slopes of white line element 51. Similarly, leading edge 52 and trailing edge 53 of luminance signal 50 produce corresponding positive and negative-going derivative components 58 and 59. When derivative signal 55 is used to velocity modulate horizontal scansion, a modified non-linear horizontal scan (shown as curve 60) results.

In the graph shown, a linear scan (shown by dashed-line 54) depicts an unmodified horizontal scan. Positive derivative component 56 produces an initial increase of scan velocity, shown by the upward slope of curve 60 departing from linear scan line 54, while the negative-going slope of derivative 55 between components 56 and 57 causes a stop, or arrest, of the horizontal scan displacement evidenced by a flat plateau area 62. Following plateau 62 is an increase of scan velocity returning horizontal scan to coincidence with linear curve 54. Similarly, positive derivative component 58 causes an initial increase of scan velocity followed by a decrease which produces scan arrest plateau 63. Finally, negative-going derivative component 59 produces an initial scan arrest shown by plateau 64, followed by an increase of scan velocity again returning the horizontal scan to linear curve 54.

As mentioned earlier, the basic idea of scan modulation image enhancement is to stop the scan at the point of image transition and allow time for the intensity control signal (luminance signal 50 in this case) to change the brightness level of the depicted image. Accordingly, the positions of plateaus 62, 63 and 64 on scan curve 60 projected upon the vertical distance axis of the graph indicate the locations of the transition edges which result in the depicted image. Similarly, the "correct" or intended position of image transitions is the projection of the transition mid-points of luminance curve 50 upon the linear scan curve. Comparison of the projections of plateaus 63 and 64 on the distance axis with those of the actual mid-points of transitions slopes 52 and 53 on the linear scan curve shows that a geometric distortion is produced by first derivative scan modulation in which white objects in the displayed image are narrowed. A similar analysis of black image objects of course shows that black objects are widened by this distortion.

FIG. 4 shows the effect of a modified second derivative velocity modulation of the horizontal scan. Again, the same sine-squared luminance signal 50 is applied which is differentiated to yield the same derivative curve 55. However, a modified second derivative of the luminance signal (shown as curve 65) is formed by first obtaining a rectified first derivative signal (curve 55A) which is then differentiated to produce scan modulation curve 65. Examination of second derivative curve 65 shows that white line element 51 produces an initial positive component 66, a negative component 67, a positive component 68 and a negative component 80. Further, transition slope 52 produces a positive component 69 and a negative component 70 while transition slope 53 produces a positive component 71 and a negative component 72. While the narrowing of white image elements and broadening of black elements found in the first derivative modulation is greatly reduced when such a modified second derivative modulation is used, an undesirable distortion of white line element 51 occurs. Examination of the modified scan curve 75 in the area of luminance element 51 shows that a pair of arrest plateaus 76 and 77 separated by distance "d" occur in response to line element 51. As mentioned, line element 51 corresponds to an image element comprising a single narrow line. However, dual arrest plateaus 76 and 77 cause horizontal scansion to be stopped in two places rather than one producing two high intensity areas which results in a "doubled" image display.

Turning now to a more detailed discussion of the operation of the present invention enhancement system, simultaneous reference to FIGS. 1 and 5 is invited. The luminance signal applied to the input of buffer 31 and differentiator 32 is shown as wave form 50 which is recognized as the sine-squared window signal. Differentiator 32 differentiates the luminance signal with respect to time producing an output signal (shown as curve 55) which is of course the same first derivative signal shown in FIG. 3. The output of differentiator 32 is full-wave rectified by network 33 producing an "absolute value", or magnitude, signal 81 in which negative-going derivative components such as 57 and 59 in curve 55 are inverted and appear as positive-going components 83 and 85 respectively. Buffer 31 couples luminance signal 50 substantially unchanged to one input summing network 34 while the absolute value signal output of network 33 is coupled to the other. Summing network 34 combines the luminance signal (curve 50) with the rectified, or absolute value signal, (curve 81) producing an expanded-element reconfigured luminance signal shown as solid line curve 86 in FIG. 5.

Comparison of the dashed-line replica of the original luminance signal (curve 50) and the expanded-element signal 86 shows that the leading edge transition 87 and 89 of white image components have been effectively advanced in time with respect to those of the original luminance signal. In contrast, trailing edge transitions 88 and 90 have been effectively delayed in time with respect to those of the original luminance signal. The amount of transition edge advance or delay may, to some extent, be controlled by the proportionate amount of magnitude signal which is combined with the original luminance signal. For reasons made more apparent below, the advance and delay are most advantageously selected to cause the resulting scan arrest plateaus to nearly coincide with the mid-point of luminance signal transitions. The smaller the image spot size of the system the more closely the transition mid-points are approached.

Once the luminance signal is properly reconfigured, it is differentiated by differentiator 38 and applied to differential amplifier 39. The enhancement signal formed by the derivative of the reconfigured luminance signal (shown as curve 95) assumes a familiar shape substantially similar to the first derivative signal 55. However, careful examination shows that the derivative components of leading edge transitions 91 and 93 occur earlier than those of first derivative curve 55 (i.e. elements 56 and 58) and that negative-going derivative components of trailing edge transitions 92 and 94 occur later than the corresponding components (i.e. 57 and 59) of curve 55.

As mentioned above, image enhancement signal 95 is coupled differentially to deflection plates 28a and 28b. The resulting modified horizontal scansion (shown as curve 100 in FIG. 5) has a general character of scan velocity modulation which is essentially the same as that of curve 60, in FIG. 3. The important difference, however, is that unlike those of curve 55, arrest plateaus 102 and 103 more nearly coincide with the projections of the luminance transition mid-points. As a result, the geometric distortion of narrowed white image elements and broadened dark image elements created by prior art first derivative image enhancement does not occur.

In addition, further comparison of scan curve 100 with the second derivative modulated scan curve 75 in FIG. 4 shows that arrest plateaus 101A and 101B produced for white-line image element 51 are more closely spaced (compare distance $d$ in FIG. 4 and $d'$ in FIG. 5) than the corresponding pair of plateaus 76 and 77 of curve 75. As a result, the objectionable high intensity white "bordering" or doubled imaging occurring in response to the prior art modified second derivative scan modulation is greatly reduced.

Figure 2:
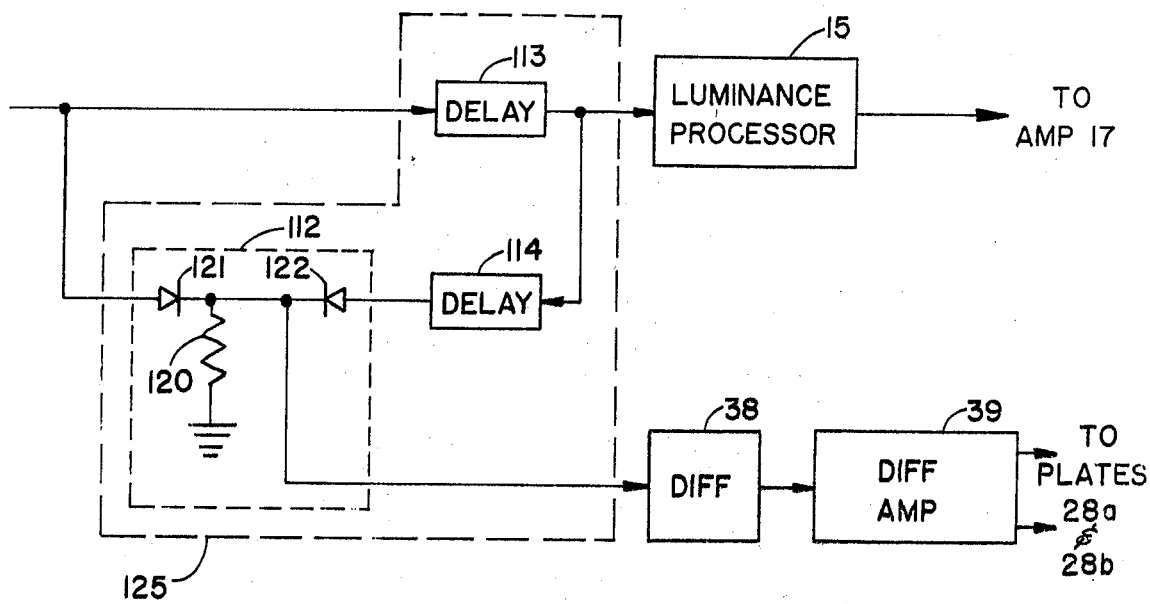
FIG. 2 is a partial block, partial schematic diagram of an alternate embodiment of the present invention image enhancement system.

The present invention image enhancement system may also be realized by using combinations of multiple incremental signal delays to produce an appropriate expanded-element luminance signal similar to that produced by the derivative and full-wave rectification system set forth above. FIG. 2 shows such a signal delay embodiment in which a delay line 113 is interposed in the luminance signal translating path between delay line 14 and luminance processor 15. The "once-delayed" output signal of delay line 113 is also coupled to a similar delay line 114, the output of which (forming a "twice-delayed" signal) is coupled to one input of a selector network 112. The luminance signal input to delay line 113 (which has not received delay by either delay line 113 or 114) is coupled to the other input of selector network 112. The output of selector network 112 is coupled to differentiator 38 and thereafter to the input of differential amplifier 39.

The general operation of the embodiment shown in FIG. 2 is substantially the same as that set forth for the embodiment of FIG. 1 in that an expanded element luminance signal is produced by luminance expanding means 125 which is applied to differentiator 38. An expanded element enhancement signal is produced by the same first derivative process shown above and differential amplifier 39 performs the same push-pull driving function for plates 28a and 28b in FIG. 1.

A more detailed understanding of system operation is best obtained by simultaneous reference to FIGS. 2 and 6. As in the systems described above, the original sine-squared luminance window signal shown by curve 50 is applied. The once-delayed replica of curve 50 (shown as curve 50') is applied to the intensity controlled circuits of CRT 21 and to delay line 114 producing a twice delayed signal shown as curve 50''. Selector network 112 responds to the combination of undelayed luminance signal 50 at one input and twice delayed luminance signal 50'' at the other input producing an output signal which represents the more positive of it's input signals. Diodes 121 and 122 couple the twice-delayed signal and undelayed signal to resistor 120. The common coupling of the cathodes of diodes 121 and 122 causes the diode having the more positive anode voltage (i.e., the applied signals) to conduct to the exclusion of the other. The signal developed across resistor 120 represents the most positive signal between the twice-delayed and undelayed signals. As a result, output signal 105 has leading edge transitions of undelayed luminance signal 50 while the trailing edge transitions of output signal 105 are those of twice delayed luminance signal 50''.

As mentioned, the intensity control circuitry within CRT 21 responds to the once delayed luminance signal 50' which because the incremental delays of lines 114 and 115 are equal, causes the intensity control signal to be "centered" with respect to the advanced leading edge transitions and delayed trailing edge transitions of expanded element luminance signal 105. Comparison of the expanded element signal 105 in FIG. 6 with the expanded element signal 86 in FIG. 5 shows that a substantially similar signal has been produced by the embodiment shown in FIG. 2.

Because expanded-element signal 105 is substantially the same as expanded element signal 86, it follows that the derivative thereof with respect to time produced by differentiator 38 is also substantially similar to enhancement signal 95 having advanced leading edge components and delayed trailing edge components. When the derivative of expanded-element signal 105 is applied to deflection plates 28a and 28b, a plurality of spot arrest plateaus substantially similar to those of curve 100 in FIG. 5 is realized.

What has been shown is a novel image-enhancement system which produces an expanded element luminance signal in which white elements are "broadened" with respect to those of the original intensity control signal and darker elements are "narrowed" in order to produce a time derivative signal which is used to velocity modulate the horizontal scansion avoiding the geometric distortions of depicted image which normally result in prior art image enhancement systems.

What is claimed is:

1. In a scanned display system in which an image is produced by scansion of a viewing screen in first and second directions, a method of image enhancement comprising the steps of:
   deriving an intensity control signal;
   applying said intensity control signal to said display system;
   producing an expanded-element intensity control signal having transition leading edges advanced with respect to those of said intensity control signal and transition trailing edges delayed with respect to those of said intensity control signal;
   differentiating said expanded-element intensity control signal to produce an image enhancement signal; and
   velocity modulating said first direction scansion with said image enhancement signal.

2. The method set forth in claim 1, wherein said step of producing an expanded-element intensity control signal includes the steps of:
   differentiating said intensity control signal with respect to time producing a first derivative signal; and
   forming the absolute value of said first derivative signal;
   combining said absolute value signal with said intensity control signal.

3. The method set forth in claim 2, wherein said step of forming the absolute value of said first derivative signal includes full-wave rectifying said intensity control signal.

4. The method set forth in claim 3, wherein said scanned display system includes a cathode ray tube having at least one electron beam caused to scan the viewing screen thereof by electromagnetic deflection means, and wherein said step of velocity modulation includes subjecting said electron beam to a field of influence distinct from said electromagnetic deflection.

5. The method set forth in claim 4, wherein said scanned display system is used in a television receiver and wherein said intensity control signal comprises the luminance signal of said receiver.

6. The method set forth in claim 1, wherein said applying step includes the step of delaying said intensity control signal to produce a once-delayed signal and wherein said step of producing an expanded-element intensity control signal includes the steps of:
  delaying said once-delayed signal to produce a twice-delayed signal; and
  forming a signal comprising the leading edge transitions of said intensity control signal and the trailing edge transitions of said twice-delayed signal.

7. In a scanned display system in which an image, having an intensity responsive to an intensity control signal, is produced by scansion of a viewing screen in first and second directions, image enhancement means comprising:
  a source of intensity control signal;
  means coupling said intensity control signal to said display system;
  element expanding means, coupled to said source of intensity control signal, producing an expanded-element intensity control signal having transition leading edges advanced with respect to those of said intensity control signal and transition trailing edges delayed with respect to those of said intensity control signal;
  first differentiating means producing an image enhancement signal by differentiating said expanded-element intensity control signal; and
  arrest means modulating the scansion velocity of said display system in said first direction in response to said image enhancement signal.

8. The scanned display system set forth in claim 7, wherein said element-expanding means include:
  second differentiating means coupled to said source of intensity control signal differentiating said intensity control signal with respect to time;
  magnitude means coupled to said second differentiating means, producing an absolute value signal for said differentiated intensity control signal;
  summing means, coupled to said second differentiating means, combining said absolute value signal and said intensity control signal.

9. The scanned display system set forth in claim 8, wherein said magnitude means include a full wave rectifier.

10. The scanned display system set forth in claim 9, wherein said first and second differentiating means each include high-pass filter networks.

11. The scanned display system set forth in claim 7, wherein said means coupling said intensity control signal to said display system include means delaying said intensity control signal producing a once-delayed intensity control signal, and wherein said element expanding means include:
  means delaying said once-delayed signal to produce a twice-delayed intensity control signal; and
  means forming said expanded element signal having the leading edge transitions of said intensity control signal and the trailing edge transitions of said twice-delayed signal.

12. In a television receiver having a cathode ray tube in which at least one electron beam is caused to scan the viewing screen thereof by synchronized horizontal and vertical deflection means, the intensity of said electron beam being controlled in part by a luminance signal; means enhancing the image produced on said viewing screen comprising:
  a source of luminance signal;
  means producing an image enhancement signal G(t) defined by the formula $$G(t) = \frac{d[af(t) + b|f'(t)|]}{dt}$$

where $f(t)$ comprises said luminance signal, $f'(t)$ comprises the first derivative of $f(t)$ with respect to time and both $a$ and $b$ are constants;
  a pair of electrostatic deflection plates positioned relative to said electron beam such that the electric field therebetween influences said horizontal deflection; and
  means coupling said image enhancement signal to said deflection plates.

* * * * *